United States Patent
Hashimoto et al.

(10) Patent No.: US 9,304,685 B2
(45) Date of Patent: Apr. 5, 2016

(54) STORAGE ARRAY SYSTEM AND NON-TRANSITORY RECORDING MEDIUM STORING CONTROL PROGRAM

(71) Applicant: Kabushiki Kaisha Toshiba, Minato-ku (JP)

(72) Inventors: Daisuke Hashimoto, Kawasaki (JP); Koichi Nagai, Ota-ku (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 149 days.

(21) Appl. No.: 14/193,547

(22) Filed: Feb. 28, 2014

(65) Prior Publication Data

US 2015/0074371 A1    Mar. 12, 2015

Related U.S. Application Data

(60) Provisional application No. 61/875,989, filed on Sep. 10, 2013.

(51) Int. Cl.
*G06F 12/00* (2006.01)
*G06F 3/06* (2006.01)

(52) U.S. Cl.
CPC .......................................... *G06F 3/06* (2013.01)

(58) Field of Classification Search
CPC ............................ G06F 12/0238; G06F 12/02
USPC ................... 711/114, 162; 714/2, 6
See application file for complete search history.

(56) References Cited

U.S. PATENT DOCUMENTS

| | | | |
|---|---|---|---|
| 7,774,643 B2 | 8/2010 | Wang |
| 8,122,193 B2 | 2/2012 | Song et al. |
| 8,209,505 B2 | 6/2012 | Abe et al. |
| 8,230,159 B2 | 7/2012 | Stenfort |
| 8,402,069 B2 | 3/2013 | Rajaram et al. |
| 8,539,315 B2 | 9/2013 | Hashimoto |
| 8,631,191 B2 | 1/2014 | Hashimoto |
| 8,667,216 B2 | 3/2014 | Hashimoto |
| 2006/0026340 A1 | 2/2006 | Ito et al. |

(Continued)

FOREIGN PATENT DOCUMENTS

| | | |
|---|---|---|
| JP | 2011-128998 | 6/2011 |
| JP | 2012-123499 | 6/2012 |

(Continued)

OTHER PUBLICATIONS

"NVM Express", Revision 1.1, (http://www.nvmexpress.org/), Oct. 11, 2012, 163 pages.

(Continued)

*Primary Examiner* — Matthew Bradley
(74) *Attorney, Agent, or Firm* — Oblon, McClelland, Maier & Neustadt, L.L.P.

(57) ABSTRACT

According to the embodiments, a storage array system includes a plurality of storage units, and a host device. The host device determines whether first data, which is restored from data in the storage units other than a replaced first storage unit, is identical with data indicated by a first function. The host device transmits and writes the first data to the first storage unit, when the first data is not identical with the data indicated by the first function. The host device transmits a deletion notification to the first storage unit, when the first data is identical with the data indicated by the first function.

20 Claims, 11 Drawing Sheets

(56) References Cited

U.S. PATENT DOCUMENTS

| | | |
|---|---|---|
| 2008/0263305 A1 | 10/2008 | Shu et al. |
| 2012/0110249 A1 | 5/2012 | Jeong et al. |
| 2012/0144097 A1 | 6/2012 | Hashimoto |
| 2012/0221776 A1 | 8/2012 | Yoshihashi et al. |
| 2012/0246388 A1 | 9/2012 | Hashimoto |
| 2012/0246393 A1 | 9/2012 | Hashimoto |
| 2012/0254514 A1 | 10/2012 | Nishikubo |
| 2012/0260025 A1 | 10/2012 | Hida et al. |
| 2015/0143032 A1 | 5/2015 | Hashimoto |

FOREIGN PATENT DOCUMENTS

| | | |
|---|---|---|
| JP | 2012-198811 | 10/2012 |
| JP | 2014-26635 A | 2/2014 |
| JP | 5586718 | 8/2014 |
| JP | 2014-182503 | 9/2014 |
| WO | WO 2013/027642 A1 | 2/2013 |
| WO | WO 2013/190878 A1 | 12/2013 |
| WO | WO 2014/147865 A1 | 9/2014 |

OTHER PUBLICATIONS

Information technology—ATA/ATAPI Command Set—3 (ACS-3), Working Draft Project American National Standard, Revision 4, T13/2161-D, Sep. 4, 2012, pp. i-539.

Information technology—SCSI Block Commands -3 (SBC-3), Working Draft American National Standard, Revision 35, Project T10/BSR INCITS 514, Dec. 7, 2012, pp. i-299.

FIG.3

MANAGEMENT INFORMATION — 44

FREE BLOCK TABLE

| PHYSICAL BLOCK ID |
|---|
| ... |
| ... |
| ... |
| ... |

ACTIVE BLOCK TABLE

| LOGICAL ADDRESS | PHYSICAL BLOCK ID |
|---|---|
| ... | ... |
| ... | ... |
| ... | ... |
| ... | ... |

ACTIVE PAGE TABLE

| LOGICAL ADDRESS | PHYSICAL BLOCK ID | PHYSICAL PAGE ADDRESS |
|---|---|---|
| ... | ... | ... |
| ... | ... | ... |
| ... | ... | ... |
| ... | ... | ... |

| STORAGE UNIT LBA | LOGICAL SLOT 0 STORAGE UNIT 2A | LOGICAL SLOT 1 STORAGE UNIT 2B | LOGICAL SLOT 2 STORAGE UNIT 2C | LOGICAL SLOT 3 STORAGE UNIT 2D | LOGICAL SLOT 4 STORAGE UNIT 2E |
|---|---|---|---|---|---|
| 0 | D(0) | D(1) | D(2) | P(0, 3) | D(3) |
| 1 | D(4) | D(5) | P(4, 7) | D(6) | D(7) |
| 2 | D(8) | P(8, 11) | D(9) | D(10) | D(11) |
| 3 | P(12, 15) | D(12) | D(13) | D(14) | D(15) |
| 4 | D(16) | D(17) | D(18) | D(19) | P(16, 19) |
| 5 | D(20) | D(21) | D(22) | P(20, 23) | D(23) |
| ... | ... | ... | ... | ... | ... |

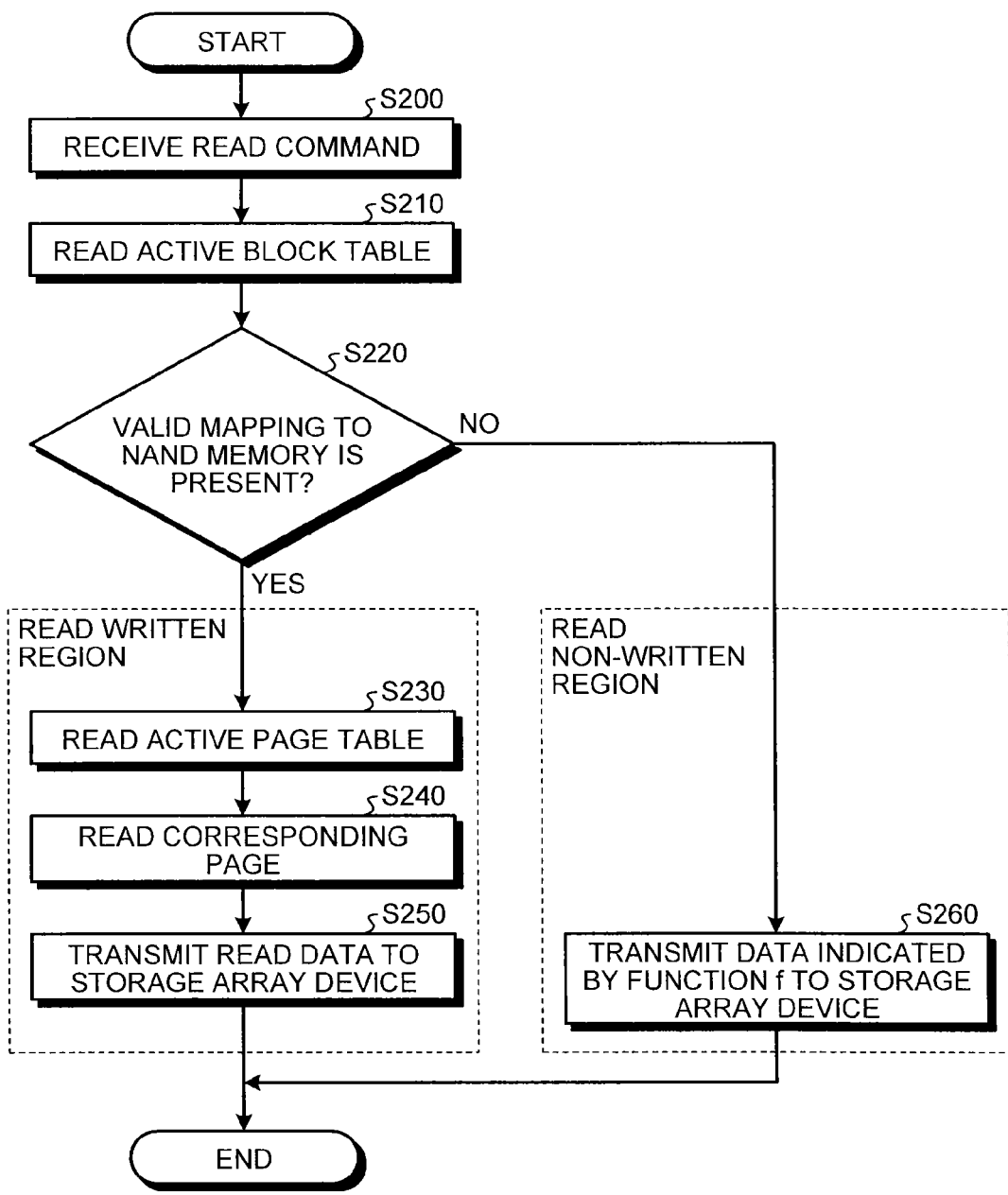

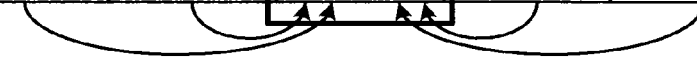

FIG.7A

| | LOGICAL SLOT 0 | LOGICAL SLOT 1 | LOGICAL SLOT 2 | LOGICAL SLOT 3 | LOGICAL SLOT 4 |
|---|---|---|---|---|---|
| | STORAGE UNIT 2A | STORAGE UNIT 2B | STORAGE UNIT 2C (SSD-1) | STORAGE UNIT 2D | STORAGE UNIT 2E |
| block 0 | D0 | D1 | D2 | D3 | P0-3 |
| block 1 | D4 | D5 | D6 | P4-7 | D7 |
| block 2 | D8 | D9 | P8-11 | D10 | D11 |
| block 3 | D12 | P12-15 | D13 | D14 | D15 |
| block 4 | D16-19 | D16 | D17 | D18 | D19 |

FIG.7B

| | LOGICAL SLOT 0 | LOGICAL SLOT 1 | LOGICAL SLOT 2 | LOGICAL SLOT 3 | LOGICAL SLOT 4 |
|---|---|---|---|---|---|
| | STORAGE UNIT 2A | STORAGE UNIT 2B | STORAGE UNIT 2C (SSD-2) | STORAGE UNIT 2D | STORAGE UNIT 2E |
| block 0 | D0 | D1 | D2 | D3 | P0-3 |
| block 1 | D4 | D5 | D6 | P4-7 | D7 |
| block 2 | D8 | D9 | P8-11 | D10 | D11 |
| block 3 | D12 | P12-15 | D13 | D14 | D15 |
| block 4 | D16-19 | D16 | D17 | D18 | D19 |

RESTORATION BY XOR OR TRANSMISSION OF TRIM COMMAND

| SLBA | STORAGE UNIT 2A | STORAGE UNIT 2B | STORAGE UNIT 2C | STORAGE UNIT 2D | STORAGE UNIT 2E |
|---|---|---|---|---|---|
| 0 | 0xB50 | 0x18C8 | 0x8164 | 0xDDD5 | 0x4F29 |
| 1 | 0x4474 | 0x607E | 0x79B | 0x4DC1 | 0x6E50 |
| 2 | 0x0 | 0x0 | 0x0 | 0x0 | 0x0 |
| 3 | 0x0 | 0x0 | 0x0 | 0x0 | 0x0 |

DATA WRITING

Deterministic zeroing trim

STORAGE ARRAY SYSTEM AND NON-TRANSITORY RECORDING MEDIUM STORING CONTROL PROGRAM

CROSS-REFERENCE TO RELATED APPLICATIONS

This application is based upon and claims the benefit of priority from U.S. Provisional Patent Application No. 61/875,989, filed on Sep. 10, 2013; the entire contents of which are incorporated herein by reference.

FIELD

Embodiments described herein relate generally to a storage array system including a storage array configured by a plurality of storage units, and a non-transitory recording medium storing a control program.

BACKGROUND

In a storage system, a plurality of storage devices is used to configure a storage array system such as RAID (Redundant Arrays of Inexpensive Disks) in order to enhance fault tolerance and redundancy.

For example, in RAID 5, a plurality of storage devices is used, and an error correction code is distributed and stored in each storage device together with data for data recovery. With this configuration, even if data corruption occurs, data can be restored by using the error correction code. When data access is impossible due to failure of a certain storage device in the RAID system described above, the faulty storage device is replaced by a new storage device to recover the RAID configuration.

When the RAID configuration is rebuilt, data in the new storage device is restored by using the data and error correction code in the storage device other than the new storage device. It is demanded to shorten the time for the recovery as much as possible.

BRIEF DESCRIPTION OF THE DRAWINGS

FIG. 3 is a diagram illustrating management information of the SSD;

FIG. 6 is a flowchart illustrating an example of a reading operation by each storage unit;

FIG. 7A is a diagram illustrating data and parity in each storage unit, when one of the plurality of storage units forming the storage array fails, and FIG. 7B is a diagram illustrating a state in which data or parity in a replaced storage unit is restored based upon the data or parity in each storage unit;

DETAILED DESCRIPTION

In general, according to one embodiment, a storage array system includes a plurality of storage units and a host device. At least one of the plurality of storage units includes non-volatile memory, a mapping for associating a logical address with a physical address, and a first control unit configured to invalidate the mapping from the logical address designated by a received deletion notification, and when the mapping from the logical address designated by a received read command is invalid, configured to transmit data derived from the designated logical address by a first function.

The host device is configured to control the plurality of storage units in a manner that the plurality of storage units configures a storage array. The host device includes a second control unit. The second control unit reads data from the storage units other than a replaced first storage unit among of the plurality of storage units. The second control unit calculates first data, using the read data, to be written in the first storage unit. The second control unit determines whether the first data is identical with second data that is derived from a first logical address by the first function, the first logical address being mapped to a first physical address in the first storage unit in which the first data is to be written. The second control unit transmits and writes the first data to the first storage unit, when the first data is not identical with the second data, and transmits not the first data but the deletion notification to the first storage unit, when the first data is identical with the second data.

First Embodiment

Figure 1:
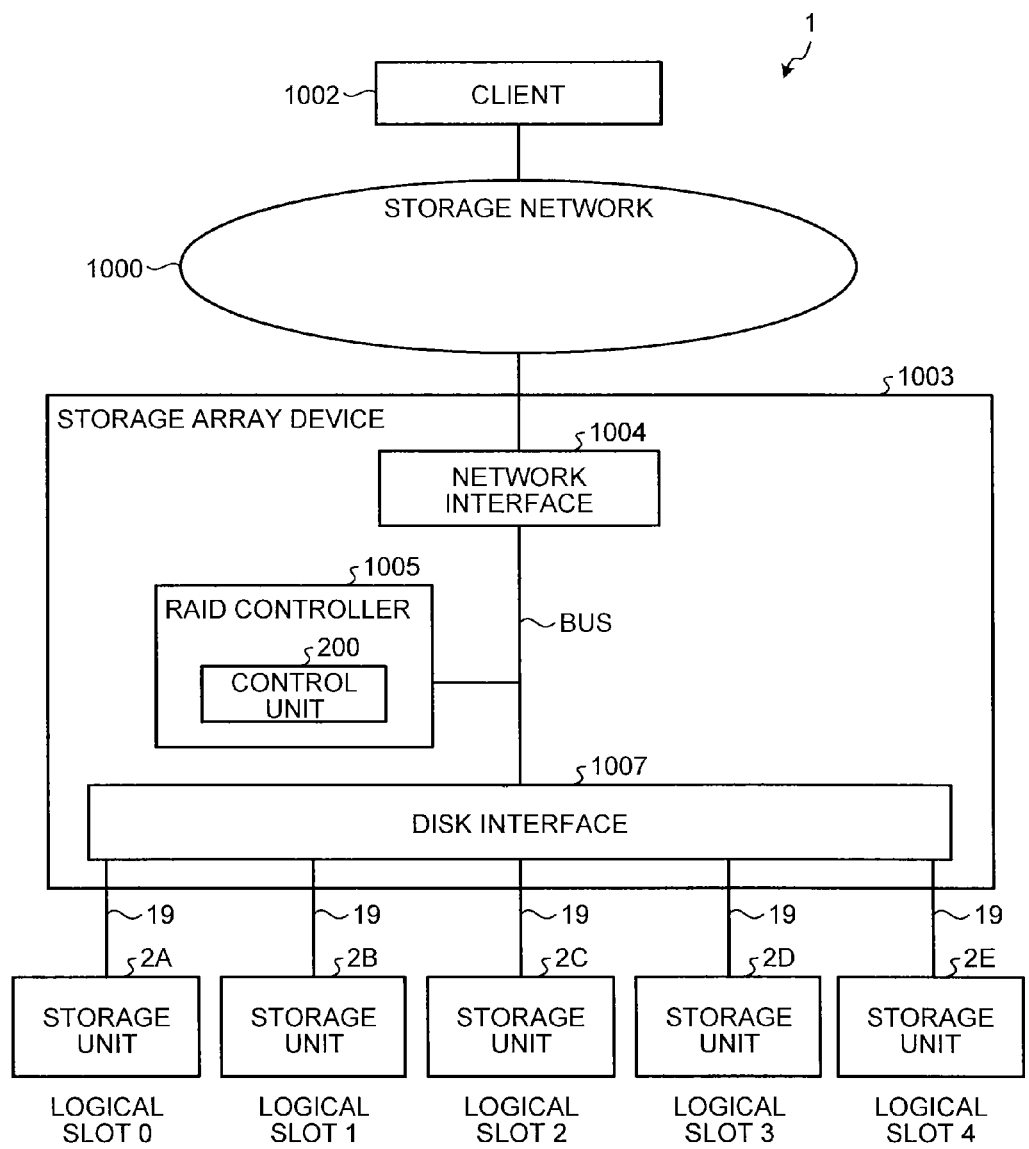
FIG. 1 is a functional block diagram illustrating an example of a configuration of a storage array system.

FIG. 1 is a diagram illustrating a storage array system according to the first embodiment. The storage array system 1 includes a storage array device 1003, which is a host device, a plurality of storage units 2A to 2E forming a storage array, an interface 19 that connects the storage array device 1003 and the storage units 2A to 2E, a client 1002, and a storage network 1000 that connects the client 1002 and the storage array device 1003.

The storage units 2A to 2E are connected to the storage array device 1003 and are respectively recognized as logical slots functioning as logical units. A RAID (Redundant Arrays of Inexpensive Disks) array is built using the logical slots. In this embodiment, the RAID5 is used as the RAID array. However, this embodiment can also be applied when a storage array is built using other RAID techniques such as RAID0, RAID2, RAID5, RAID4, RAID6, and RAID Z and other storage array implementation forms.

The network 1000 is a storage network for storage access. For example, a Fibre Channel or an Ethernet (registered trademark) is used.

The client 1002 is a computer connected to the storage network 1000 and configured to carry out desired processing. For example, the client 1002 executes a business application program under the control by the processor to thereby I/O- access the storage array device 1003 through the storage network 1000 and realize a desired business system. The client 1002 can be a database server (DB server) in which a database management system (DBMS) is operating. Then, upon receiving a data read request from a client (not shown in the figure) connected to the DB server through the storage network 1000 or another network (not shown in the figure), the client 1002 reads data from the storage array device 1003 and transmits the read data to the client. Upon receiving a data write request from the client, the client 1002 receives write data from the client and writes the data in the storage array device 1003.

The storage array device 1003 uses logical slots 0 to 4 as configuration units of RAID. The storage units 2A to 2E are connected to the storage array device 1003 through the interface 19. The storage unit 2A is allocated to the logical slot 0, the storage unit 2B is allocated to the logical slot 1, the storage unit 2C is allocated to the logical slot 2, the storage unit 2D is allocated to the logical slot 3, and the storage unit 2E is allocated to the logical slot 4. Consequently, the storage array device 1003 notifies the client 1002 of the five logical slots corresponding to the five storage units 2A to 2E as virtual one logical device using the RAID5.

The client 1002 transmits an LBA for accessing the storage array device (hereinafter referred to as "array LBA" or "ALBA"). A control unit 200 in a RAID controller 1005 transforms the array LBA into logical slot numbers and LBAs for accessing the storage units 2A to 2E (hereinafter referred to as "storage unit LBAs" or "SLBAs"). The control unit 200 transmits an access command to the SLBA of at least one storage unit among the storage units 2A to 2E specified by the logical slot numbers.

The storage units 2A to 2E are storage units connected to the storage array device 1003 through the interface 19. In this embodiment, a SSD (Solid State Drive), which is a nonvolatile storage device, is used as the storage unit. However, the storage unit can be other storage devices such as a hard disk drive (HDD), a hybrid drive, a SD card, a USB memory, a NAND flash memory chip, a magnetic tape, an embedded Multi Media Card (eMMC).

Figure 2:
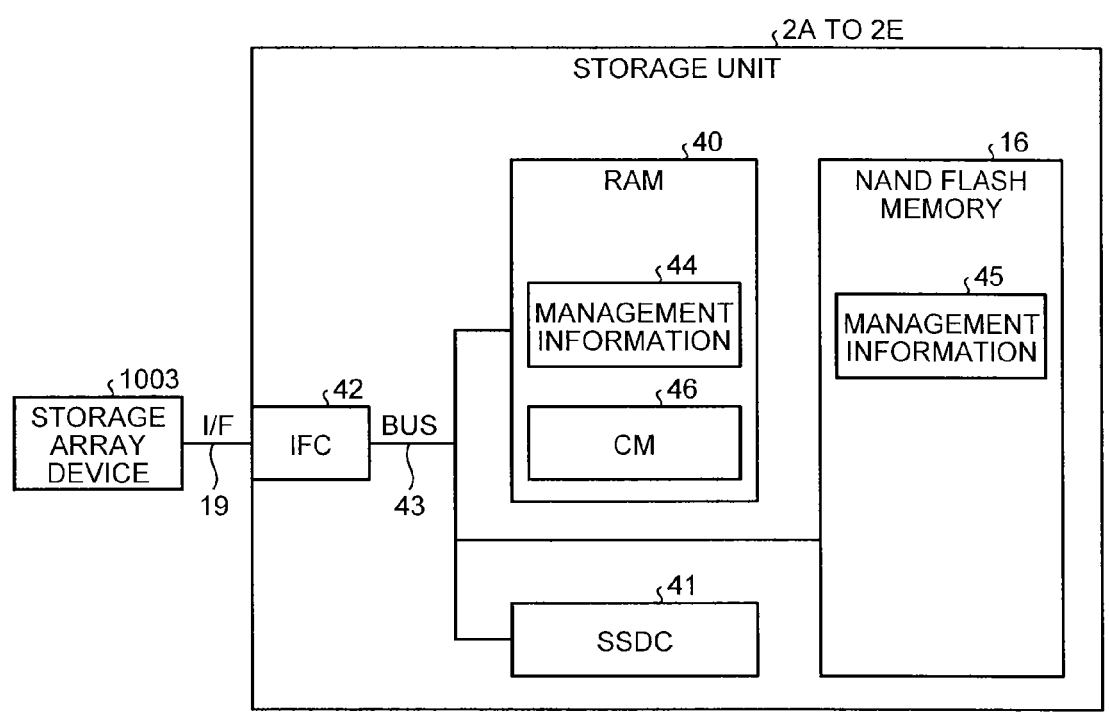
FIG. 2 is a functional block diagram illustrating an example of an internal configuration of an SSD that is one example of a storage unit forming the storage array system.

FIG. 2 shows an internal configuration example of the SSD used as components of the storage units 2A to 2E. the storage units 2A to 2E functioning as SSD respectively include a NAND type flash memory (hereinafter abbreviated as NAND memory) 16 functioning as a non-volatile semiconductor memory, an interface controller (IFC) 42 configured to perform transmission and reception of signals to and from the storage array device 1003 via the interface 19, a RAM (Random Access Memory) 40 functioning as a semiconductor memory including a cache memory (CM) 46 functioning as an intermediate buffer between the IFC 42 and the NAND memory 16, a SSD controller (SSDC) 41 configured to administer management and control of the NAND memory 16 and the RAM 40 and control of the interface controller 42, and a bus 43 configured to connect these components.

As the RAM 40, for example, a volatile RAM such as a DRAM (Dynamic Random Access Memory) or a SRAM (Static Random Access Memory) or a nonvolatile RAM such as a FeRAM (Ferroelectric Random Access Memory), a MRAM (Magnetoresistive Random Access Memory), a PRAM (Phase Change Random Access Memory), or a ReRAM (Resistance Random Access Memory) can be adopted. The RAM 40 can be included in the SSDC 41.

The NAND memory 16 includes a plurality of NAND memory chips. The NAND memory 16 stores user data designated by the storage array device 1003, and stores management information 45 for backup of RAM 40. The NAND memory 16 includes the memory cell array in which a plurality of memory cells are arrayed in a matrix shape. The respective memory cells can perform multi-level storage. The NAND memory 16 includes a plurality of memory chips. Each of the memory chips is configured by arraying a plurality of blocks, which are units of data erasing. In the NAND memory 16, write of data and read of data are performed for each page. The block includes a plurality of pages.

The RAM 40 includes the cache memory (CM) 46 functioning as a cache for data transfer between the storage array device 1003 and the NAND memory 16. The RAM 40 functions as a memory for management information storage and a memory for work area. Management information 44 managed in the RAM 40 is obtained by loading the management information 45 from the NAND memory 16 when the storage unit 2A to 2E are booted. The management information 44 are backed up in the NAND memory 16 periodically, when a standby command is received, when a flash command is received, or when a power supply is interrupted.

A function of the SSDC 41 is realized by a processor configured to execute a system program (firmware) stored in the NAND memory 16, various hardware circuits, and the like. The SSDC 41 executes, in response to various commands such as a write request, a cache flash request, a deletion notification, and a read request from the storage array device 1003, data transfer control between the storage array device 1003 and the NAND memory 16, update and management of the management information stored in the RAM 40 and the NAND memory 16, ECC encoding of data write to the NAND memory 16, ECC decoding of data read from the NAND memory 16, and the like.

The IFC 42 has a function for receiving a read request, a write request, other requests, and data from the storage array device 1003, transmitting the received requests and the data to the SSDC 41, and transmitting the data to the RAM 40 according to the control by the SSDC 41.

In this embodiment, as illustrated in FIG. 3, the management information 44 includes a free block table, an active block table, and an active page table. The active block table executes mapping management for associating the storage unit LBA (SLBA) that is the logical address designated from the storage array device 1003 with the physical block ID, wherein the physical block (active block) registered in the active block table retains data valid for at least the SSDC 41. The free block table manages a physical block that is not mapped from the SLBA. The physical block (free block) registered in the free block table is not mapped from the SLBA, so that the free block does not retain valid data.

The active page table performs management for associating the physical page address with the SLBA, wherein the physical page (active page) registered in the active page table retains data valid for at least the SSDC 41. The physical page registered in the active page table is associated with the physical block ID (physical block address) to which the physical page belongs.

The RAID controller 1005 controls building and management of a RAID array of the plurality of the storage unit 2A to 2E connected to a disk interface 1007 and includes the control unit 200. The control unit 200 takes various implementation forms such as firmware and software stored in a memory in the RAID controller 1005, hardware in the RAID controller 1005 or software stored in a memory of a host computer. Upon receiving a command from the client 1002 through a network interface 1004, the control unit 200 transmits a read command, a write command, deletion command (trim command), other commands, and data to the storage units through the storage interface 1007, receives responses and data from the storage units, and transmits a response and the data to the client 1002 through the network interface 1004.

Figures 4, 5:
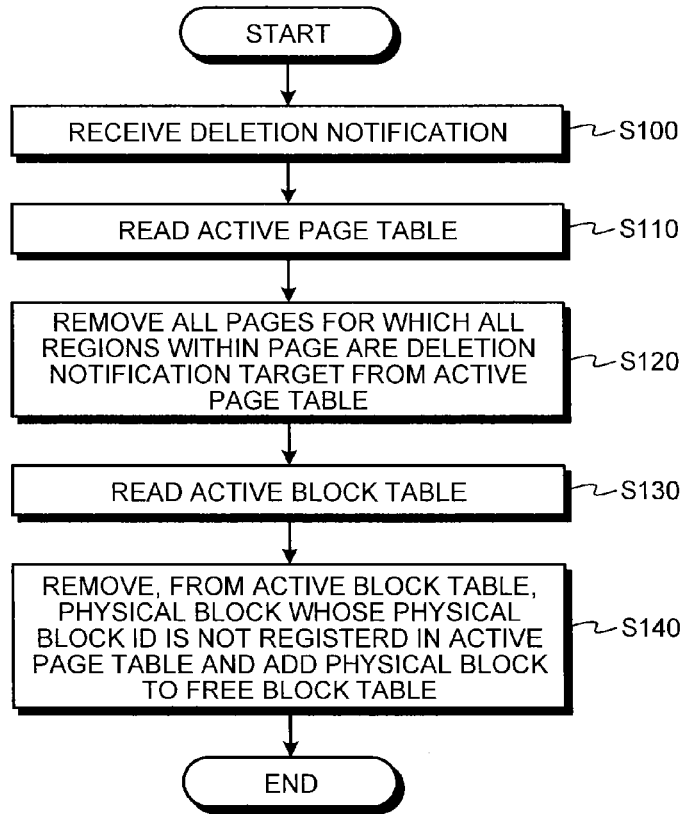
FIG. 4 is a diagram illustrating a translation method between an array LBA (ALBA) and a storage unit LBA (SLBA)
FIG. 5 is a flowchart illustrating an example of an operation of each storage unit receiving a deletion notification.

In FIG. 4, a transformation method for an array LBA (ALBA) and a storage unit LBA (SLBA) in this embodiment is shown. The control unit 200 adopting the RAID5 generates, using four continuous logical sectors ALBA=4q, 4q+1, 4q+2, and 4q+3 (q is an arbitrary integer equal to or larger than 0) as a set, parity data P(4q, 4q+3) equivalent to one logical sector with respect to array data D(ALBA=4q), D(ALBA=4q+1), D(ALBA=4q+2), and D(ALBA=4q+3), which are data of the respective logical sectors.

The parity data P(4q, 4q+3) is calculated by exclusive ORing respective bits having the same offset in logical sectors in D(ALBA=4q), D(ALBA=4q+1), D(ALBA=4q+2), and D(ALBA=4q+3) in such a manner as P(4q, 4q+3)=(D(ALBA=4q) XOR D(ALBA=4q+1) XOR D(ALBA=4q+2) XOR D(ALBA=4q+3). For example, parity data P(0,3) is calculated by the control unit 200 from D(0), which is data of ALBA=0, D(1), which is data of ALBA=1, D(2), which is data of ALBA=2, and D(3), which is data of ALBA=3. In the normal state, array data D(ALBA=4q), D(ALBA=4q+1), D(ALBA=4q+2), and D(ALBA=4q+3) and parity data P(4q, 4q+3) are distributedly managed in the storage units 2A to 2E as shown in FIG. 4. For example, in the case of the ALBA-1, data D(1) corresponding thereto is stored in LBA=SLBA=0 of the storage unit 2B allocated to the logical slot 1. Upon receiving the ALBA=1 from the client 1002, the control unit 200 specifies a logical slot number-1 and SLBA=0.

For example, upon receiving a read command for the ALBA=1 from the client 1002, the control unit 200 specifies the logical slot number=1 and the SLBA=0, which are storage destination of D(1), transmits a read command for the SLBA=0 to the storage unit 2B connected to the logical slot number=1, receives read data, and transmits the received read data to the client 1002. When a response is not received from the storage unit 2B or when an error response is received from the storage unit 2B, the control unit 200 transmits a read command for the SLBA=0 to the storage unit 2A, the storage unit 2C, and the storage unit 2D connected to the logical slot 0 and the logical slots 2 to 4 other than the logical slot 1, restores D(1) from received data D(0), D(2), P(0,3), and D(3) through exclusive OR, and transmits the restored D(1) to the client 1002. Data read for D(0), D(2), P(0,3), and D(3) can be performed in parallel during the read of D(1).

For example, upon receiving a write command and write data for the ALBA-1 from the client 1002, the control unit 200 specifies the logical slot number=1 and the SLBA=0, which are storage destination of D(1), transmits a write command for the SLBA=0 to the storage unit 2B having the logical slot number=1, writes data to be written, reads the data D(0), D(2) and D(3) from the SLBA=0 of the storage unit 2A, the storage unit 2C, and the storage unit 2E, which are the storage units connected to the slots other than the logical slot number 1 and not having parity data stored in the SLBA=0, calculates the parity data P(0,3) from D(0), D(1), D(2), and D(3), and writes the parity data P(0,3) in the SLBA=0 of the storage unit 2D.

When data is deleted on the storage array device 1003 or on the client 1002, the storage array device 1003 has a function of giving a deletion notification to the storage units 2A to 2E. An example of a command for deletion notification includes Data Set Management Command (commonly called a trim command) described in INCITS ATA/ATAPI Command Set-2 (ACS-2). The deletion notifying process is a process capable of notifying the storage units 2A to 2E of SLBA regions (LBA Range Entry) when data of the LBA region is deleted on the storage array device 1003 or the client 1002. In this embodiment, the deletion notification includes the information of the SLBA region including SLBA and sector count. Then, the SLBA regions can be treated as free areas on the storage units 2A to 2E. The storage units 2A to 2E can create free blocks through the deletion notifying process.

The function of a trim command may be realized by not only Data Set Management Command but also, for example, another command such as a vendor-specific command using an SCT command described in ACS2. When an interface other than the SATA interface is used as the interface 19, a command for the deletion notifying process intrinsic to the interface may be used as the trim command. For example, Deallocate (AD) of an 11h Dataset Management command described in NVM Express Revision 1.1, Oct. 11, 2012 (http://www.nvmexpress.org/) may be used as the trim command. For example, when the storage units 2A to 2E has a Deterministic Zeroing TRIM function to be described below, the function of the trim command may be realized by not only the above-described command but also a 08h Write Zeroes command described in NVM Express Revision 1.1. Furthermore, a 42h UNMAP command described in SCSI Block Commands-3 (SBC-3), Revision 35, Dec. 7, 2012 (http://www.t10.org/) may be used as the trim command.

On the other hand, when the storage units 2A to 2E receive the deletion notification, they have a function of invalidating the region corresponding to the logical address that is the target of the deletion notification, or a function in which mapping from the logical address legion that is the target of the deletion notification to the NAND flash memory is invalidated. The storage units 2A to 2E have a function of returning deterministic data to the storage array device 1003, when reading occurs on the region that is the target of the deletion notification afterward. Such functions are referred to as deterministic data returning function A in the present specification. In the invalidating process on the storage units, the corresponding region of the invalidating process is recognized to be invalid by rewriting management information. Data of the corresponding region may not be actually deleted or may be deleted.

<Deletion Notifying Process on Storage Unit>

The process on the storage units 2A to 2E when the deletion notifying process is received from the storage array device 1003 will be described with reference to FIG. 5. The storage units 2A to 2E receive a deletion notification from the storage array device 1003 (step S100). The deletion notification includes a deletion command and SLBA range information. The SLBA range information includes an SLBA and a sector count (a sector size). The SSDC 41 in the storage units 2A to 2E reads the active page table from the RAM 40 (step S110). The SSDC 41 removes, from the active page table, all of the pages whose overall areas are mapped from the LBA regions which are specified by the deletion notification (step S120). Thus, data in the pages of the deletion notification target are changed from device-valid data to device-invalid data.

The SSDC 4B reads the active block table from the RAM 40 (step S130). The SSDC 41 removes the physical block whose physical block ID is not registered in the active page table from the active block table and adds the physical block to the free block table (step S140).

In this way, the storage units 2A to 2E change the data, which is stored in the SLBA that is the target of the deletion notification process on the NAND region from the device-valid data to the device-invalid data, thereby being capable of increasing a number of free blocks.

<Reading Operation>

Next, the reading operation by the storage units 2A to 2E will be described with reference to FIG. 6. The storage units 2A to 2E receive a read command from the storage array device 1003 (step S200). The read command includes information of SLBA regions to be read. For example, the information of the SLBA regions includes a LBA and a sector count.

The SSDC 41 in the storage units 2A to 2E reads the active block table from the RAM 40 (step S210). The SSDC 41 selects the physical block IDs mapped from the SLBA regions (step S220). When the physical block IDs exist in the active block table, the SSDC 41 reads data from blocks of the block IDs. That is, the SSDC 41 reads the active page table (step S230), searches physical page addresses mapped from the SLBA regions from the active page table and reads data from the physical addresses of the NAND memory 16 (step S240). The SSDC 41 transmits the read data to the storage array device 1003 (step S250).

When valid mappings from the SLBA regions to NAND memory 16 are not present, the SSDC 41 performs a process of reading a non-written region. For example, when a SLBA region is not mapped to a valid physical block ID in the active block table, the SSDC 41 performs a process of reading a non-written region. That is, the SSDC 41 does not read data from the NAND memory 16 and the SSDC 41 transmits data calculated by a function f to the storage array device 1003 (step S260). In other words, the SSDC 41 transmits output data from the function f to the storage array device 1003. In other words, the SSDC 41 transmits output data indicated by the function f to the storage array device 1003. The data length of the data is equal to the size of the SLBA region. Specifically, when it is assumed that Ai is an address and Di is data, the data indicated by the function f satisfies:

f(Ai)=Di (where i is an integer equal to or greater than 0).

The function f can be configured arbitrarily. For example, when SLBA is set as an independent variable for a function f and the function f is defined as:

f(SLBA)=0, the SSDC 41 transmits data filled with "0" of the data length of the SLBA region in response to the read request from the storage array device 1003. The function f may be stored in the SSDC 41, may be stored in the NAND memory 16, or may be stored in the RAM 40.

To improve the speed of the process of reading the non-written region, it is preferable to store the function f in the SSDC 41 or the RAM 40. The function f may be stored in the NAND memory 16 while the storage units 2A to 2E are powered off, and the SSDC 41 may read the function f from the NAND memory 16 to the RAM 40 when the storage units 2A to 2E are powered on.

The output data of the function f may be stored in the RAM 40, SSDC 41, or NAND memory 16 temporarily or as a cache. According to this configuration, the cache data is directly transmitted to the storage array device 1003 without calculating the output data of the function f during the process of reading the non-written region, whereby the speed of the process of reading the non-written region can be more improved.

In the process of reading the non-written region, the SSDC 41 doesn't read data from the NAND memory 16 or read substantially little data from NAND memory 16. Therefore, the process of reading the non-written region is performed at higher speed than the process of reading the written region in which the SSDC 41 reads both of the active page table and the NAND memory 16.

When a SLBA region having device-invalid data is read, data transmitted from the storage units 2A to 2E to the storage array device 1003 may be any data. In this embodiment, however, the data is required to be at least deterministic data for each LBA. Further, the storage units 2A to 2E preferably notifies the storage array device 1003 that the read data of the device-invalid data of the storage units 2A to 2E is deterministic when the storage units 2A to 2E is activated or is connected to the storage array device 1003. For example, as described in ACS-2, bit14 of IDENTIFY DEVICE data word 169 is set to 1. Thus, the storage units 2A to 2E can notify the storage array device 1003 in advance that the value of the device-invalid data is deterministic. Thus, the data deterministic at least for each SLBA is expressed as follows using the function f(SLBA) in the invention:

data=f(SLBA).

In particular, when f(SLBA)=0, bit5 of IDENTIFY DEVICE data word 169 is preferably set to 1, and thus the storage units 2A to 2E can notify the storage array device 1003 in advance that a read data of the device-invalid data is the fixed value of 0 (that the storage units 2A to 2E support the Deterministic Zeroing TRIM feature). When f(LBA)=0, particularly, when a logical sector size is 512 bytes, the function f outputs data filled with 0 such as "f(LBA)=00000 . . . 0" (0-fill) of 512 byte length.

<Array Rebuilding Process>

The array rebuilding process performed by the control unit 200 in the storage array device 1003 will next be described. It is supposed that the SSD-1 serving as the storage unit 2C among the storage units 2A to 2E forming the RAID 5 breaks down, and data cannot be read from the storage unit 2C, as illustrated in FIG. 7A. The faulty SSD-1 serving as the storage unit 2C is replaced (exchanged) by a new SSD-2, as illustrated in FIG. 7B. When the new SSD-2 is loaded to the logical slot 2, the control unit 200 in the storage array device 1003 detects the loading, and performs a process of recognizing the new SSD-2 as the storage unit 2C of the logical slot 2, as well as the array rebuilding process for restoring data and parity in the storage unit 2C by using the data and parity, serving as an error correction code, stored in the storage units 2A, 2B, 2D, and 2E other than the storage unit 2C. A write command and a deletion notification command (Trim command) are used for restoring the storage unit 2C during the array rebuilding process as illustrated in FIG. 7B.

Figure 8:
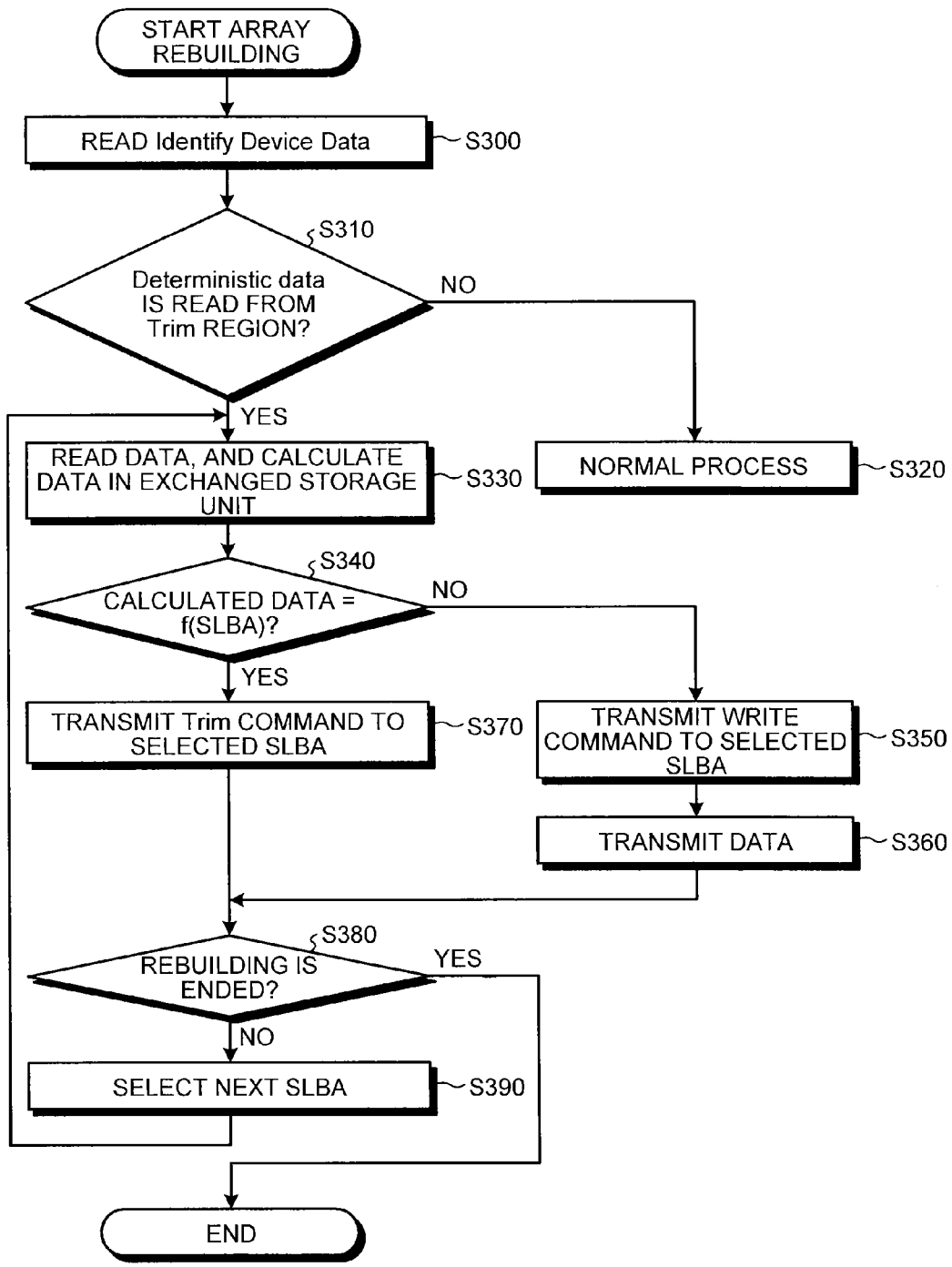
FIG. 8 is a flowchart illustrating a procedure of a storage array rebuilding process according to a first embodiment.

FIG. 8 is a flowchart illustrating a procedure of the array rebuilding process executed by the control unit 200 according to the first embodiment. When detecting loading of the new SSD-2 to the logical slot 2, the control unit 200 transmits a device identification command to the new SSD-2 as the storage unit 2C to acquire Identify Device data from the storage unit 2C (step S300). The control unit 200 determines whether the storage unit 2C have the deterministic data returning function A in which deterministic data f(SLBA) is read from the Trim region designated by the deletion notification (Trim command) or not based upon Identify Device data acquired from the storage unit 2C (step S310).

When determining that the storage unit 2C does not have the deterministic data returning function A (step S310: No), the control unit 200 executes a normal array rebuilding process (step S320). In the normal array rebuilding process, the control unit 200 reads data or parity from the storage units 2A, 2B, 2D, and 2E other than the storage unit 2C, restores the data or parity in the storage unit 2C from the read data or the parity, transmits the write command to the storage unit 2C, transmits the restored data or parity to the storage unit 2C via the interface 19, and writes the restored data or parity on the storage unit 2C, whereby the array rebuilding process is executed.

When determining that the storage unit 2C have the deterministic data returning function A (step S310: Yes), the control unit 200 transmits a read command including a read start address and a read size to the storage units 2A, 2B, 2D, and 2E other than the storage unit 2C to read the data or parity in the first SLBA region. The control unit 200 then calculates the data or parity in the first SLBA region in the storage unit 2C based upon the read data or parity (step S330). If the storage units 2A, 2B, 2D, and 2E have the deterministic data returning function A, during the data reading in step S330, the deterministic data f(SLBA) indicated by the function f may or may not be read from the storage units 2A, 2B, 2D, and 2E when the physical block ID corresponding to the logical block ID is not present, as previously described for the process of reading the non-written region in step S260 in FIG. 6.

Then, the control unit 200 determines whether the data calculated in step S330 is the deterministic data f(SLBA) indicated by the function f or not (step S340). When determining that the data calculated in step S330 does not match the f(SLBA) as a result of the determination, the control unit 200 transmits the write command for writing data in the first SLBA region and the data calculated in step S330 to the storage unit 2C via the interface 19 (steps S350 and S360). As a result, the data or parity calculated in step S330 is actually written on the first SLBA region in the storage unit 2C.

On the other hand, when determining that the data calculated in step S330 matches the f(SLBA) as a result of the determination in step S340, the control unit 200 transmits, to the storage unit 2C, not the write command but the deletion notification (Trim command) for invalidating the data in the first SLBA region (step S370). The control unit 200 does not transmit the data calculated in step S330 to the storage unit 2C. The storage unit 2C receiving the deletion notification updates the active page table or the active block table in order to invalidate the page or block corresponding to the logical address designated by the deletion notification as illustrated in FIG. 5. As a result, the data f(SLBA) is read from the storage unit 2C as described above, when the read command for reading the data on the logical address designated by the deletion notification is inputted to the storage unit 2C.

Then, the control unit 200 confirms whether the restoration of all SLBAs in the storage unit 2C is completed or not (S180). When the restoration of all SLBAs is not completed, the control unit 200 selects the next SLBA region that is to be restored (step S390), and executes the processes in steps S330 to S370 to the next SLBA region as described above, thereby restoring data or parity in the next SLBA region in the storage unit 2C. This process is sequentially repeated to each SLBA region to restore all SLBAs in the storage unit 2C.

Figures 9, 10:
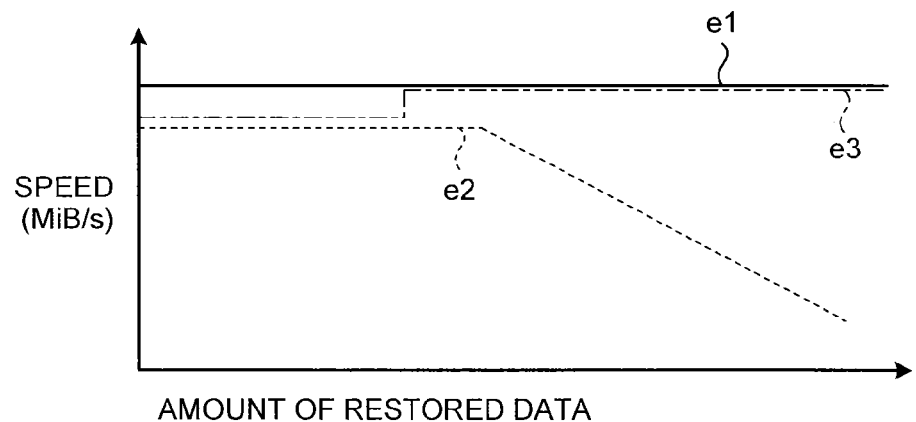
FIG. 9 is a diagram conceptually illustrating the storage array rebuilding process according to the first embodiment.
FIG. 10 is a diagram illustrating a relationship among a restored data amount, reading speed, and writing speed according to the first embodiment.

FIG. 9 illustrates the restoration process of the storage unit 2C when the storage units 2A to 2E have a Deterministic Zeroing TRIM function. When SLBA=0, and SLBA=1, data restored from the data or parity in the storage units 2A, 2B, 2D, and 2E is not (0-fill) data. Therefore, the restored data is actually written on SLBA=0 and SLBA=1 in the storage unit 2C. On the other hand, in the case of SLBA=2 and SLBA=3, data restored from the data and parity in the storage units 2A, 2B, 2D, and 2E is the (0-fill) data. Therefore, the deletion notification (TRIM command) is sent to the SLBA=2 and SLBA=3 in the storage unit 2C. In this case, the (0-fill) data that is the restored data is not transmitted to the storage unit 2C.

FIG. 10 illustrates the relationship between the amount of the restored data and speed, when the restoration of the data in the storage unit 2C replaced and the data reading from the storage units 2A, 2B, 2D, and 2E other than the storage unit 2C are performed in parallel. e1 indicated by a solid line represents the data reading speed from the storage units 2A, 2B, 2D, and 2E, and it keeps almost constant regardless of the amount of the restored data.

e2 indicated by a broken line represents the array rebuilding speed when the restoration of the data in the storage unit 2C is done by the data writing to the storage unit 2C as described in step S320 in FIG. 8. The line e2 indicates that, since data is written on all LBA regions including the non-written region and unused regions, the rebuilding speed decreases with the increase in the amount of restored data, and since the free block is unnecessary used, the performance and reliability of the storage unit are deteriorated.

e3 indicated by a chain line indicates the array rebuilding speed when data writing and the deletion notification (Trim command) are used together by employing the technique in the first embodiment. The e3 indicates that the rebuilding speed does not decrease even if the amount of restored data increases, since the lower the valid data occupancy becomes, the more significant effect is obtained.

In the embodiment described above, after the loading of a new storage unit into a logical slot is detected, the array rebuilding process is started. The array rebuilding process may be started according to the operator's instruction to the control unit 200.

In addition, a different data pattern may be generated for each of a plurality of logical address regions as the deterministic data f(SLBA) indicated by the function f. For example, different data patterns for two logical address regions may be generated from the function f, such as the case where 0-fill data is used as the data pattern for the first half of the logical address region, and 1-fill data (data having all bits filled with "1") is used as the data pattern for the last half of the logical address region. The data patterns generated by function f(SLBA) may be different for each of three or more different logical address regions.

As described above, according to the first embodiment, when the data restored from the storage data in the storage unit other than the replaced storage unit (the newly loaded storage unit) is identical with deterministic data f(SLBA), the deletion notification is transmitted to the loaded storage unit. Accordingly, the time for rebuilding the storage array is shortened, and deterioration in the performance and reliability of the storage unit is not encouraged, compared to the case where restored data is written on all storage regions.

Second Embodiment

Figure 11:
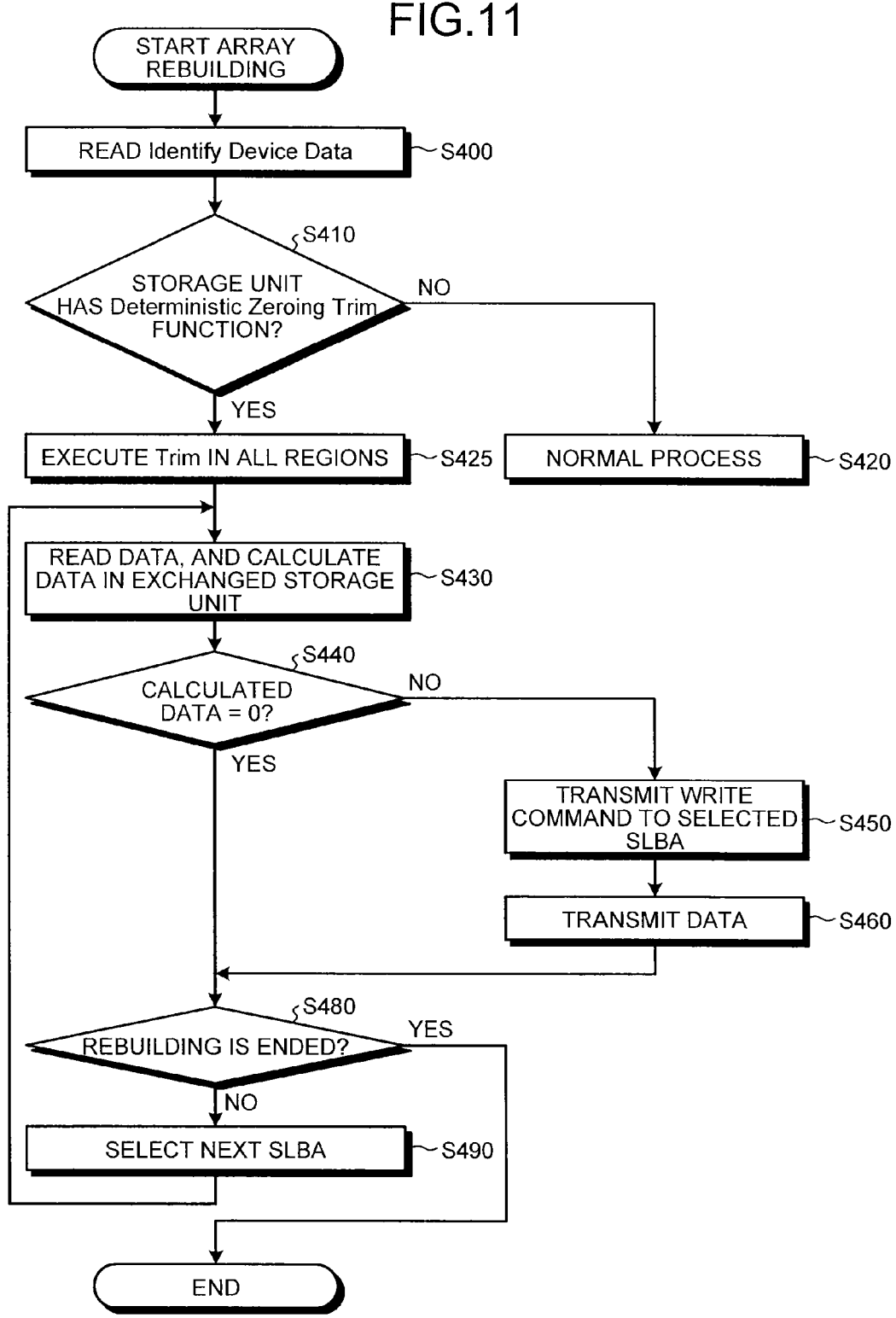
FIG. 11 is a flowchart illustrating a procedure of a storage array rebuilding process according to a second embodiment.

FIG. 11 is a flowchart illustrating the procedure of the array rebuilding process according to the second embodiment. The second embodiment illustrates the restoration process by transmitting the Trim command to all SLBAs in the storage unit that is the target of the restoration at the beginning. In the second embodiment, Deterministic TRIM is executed to the user region in the drive (unit) to create the state in which specific data (0-fill data for example) is stored in all SLBAs of the storage unit from which data is restored at the beginning.

As in the first embodiment, the second embodiment describes the case in which the storage unit 2C is the target to be rebuilt. As in the first embodiment, the control unit 200 transmits the device identification command to the storage unit 2C, and acquires the Identify Device data from the storage unit 2C (step S400), when executing the array rebuilding process. The control unit 200 determines whether the storage unit 2C has the Deterministic Zeroing TRIM function or not based upon the Identify Device data acquired from the storage unit 2C (step S410).

When determining that the storage unit 2C does not have the Deterministic Zeroing TRIM function (step S410: No), the control unit 200 executes the normal array rebuilding process as in the previous first embodiment (step S420).

When determining that the storage unit 2C has the Deterministic Zeroing TRIM function (step S410: Yes), the control unit 200 firstly transmits the deletion notification (TRIM command) to all SLBAs in the storage unit 2C. This process creates the state in which the (0-fill) data is stored in the SLBA of the storage unit 2C (step S425).

Then, the control unit 200 transmits a read command including a read start SLBA and a read sector count to the storage units 2A, 2B, 2D, and 2E other than the storage unit 2C to read the data or parity in the first LBA region. The control unit 200 then calculates the data or parity in the first LBA region in the storage unit 2C based upon the read data or parity (step S430).

Then, the control unit 200 determines whether the data calculated in step S430 is the (0-fill) data or not (step S440). When the data calculated in step S430 is not the (0-fill) data as a result of the determination, the control unit 200 transmits a write command for writing the data in the first SLBA region and the data calculated in step S430 to the storage unit 2C (steps S450 and S460). As a result, the data or parity calculated in step S430 is actually written on the first SLBA region in the storage unit 2C.

On the other hand, when the data calculated in step S430 matches the (0-fill) data as a result of the determination in step S440, the control unit 200 executes no process. Since the process in step S425 is preliminarily performed, the (0-fill) data is already stored on the first SLBA region.

Then, the control unit 200 confirms whether the restoration of all SLBAs in the storage unit 2C is completed or not (S280). When the restoration of all SLBAs is not completed, the control unit 200 selects the next SLBA region that is to be restored (step S490), and executes the processes in steps S430 to S460 to the next SLBA region as described above, thereby restoring data or parity in the next SLBA region in the storage unit 2C. This process is sequentially repeated to each SLBA region to restore all SLBAs in the storage unit 2C.

As described above, according to the second embodiment, in the case of the storage array supporting the Deterministic Data TRIM function, the command for setting all storage regions to specific data (0-fill data for example) storage state is firstly transmitted to the newly loaded (replaced) storage unit without transmitting the specific data to the newly loaded storage, and then, only when the restored data based upon the data in the other storage units does not match the specific data, the restored data is written on the storage region having its logical address. Accordingly, the time for rebuilding the storage array is shortened, and deterioration in the performance and reliability of the storage unit is not encouraged, compared to the case where restored data is written on all storage regions.

Third Embodiment

Figure 12:
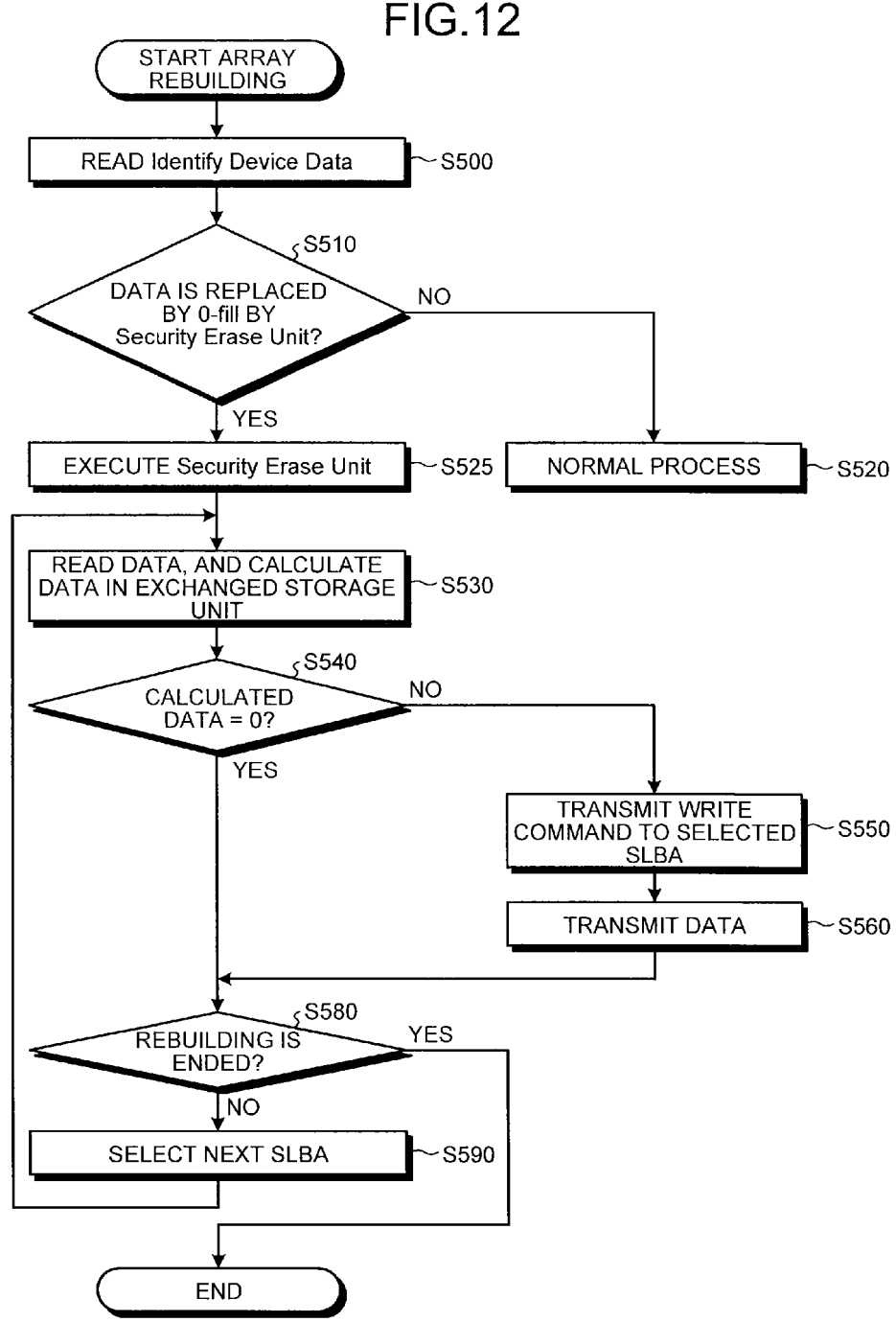
FIG. 12 is a flowchart illustrating a procedure of a storage array rebuilding process according to a third embodiment.

FIG. 12 is a flowchart illustrating the procedure of the array rebuilding process according to the third embodiment. The third embodiment describes the restoration process in which a Security Erase Unit command is firstly transmitted to the storage unit that is the target of the restoration to create the state in which the specific data (0-fill data for example) is stored in all SLBAs of the storage unit from which data is to be restored at the beginning.

As in the first embodiment, the third embodiment describes the case in which the storage unit 2C is the target to be rebuilt. As in the first embodiment, the control unit 200 transmits the device identification command to the storage unit 2C, and acquires the Identify Device data from the storage unit 2C (step S500), when executing the array rebuilding process. The control unit 200 determines whether all SLBAs of the storage unit 2C can be replaced by the (0-fill) data by Security Erase Unit command or not based upon the Identify Device data acquired from the storage unit 2C (step S510).

When determining that data in all SLBAs of the storage unit 2C cannot be replaced by the (0-fill) data by the Security Erase Unit command, the control unit 200 executes the normal array rebuilding process as in the previous first embodiment (step S520).

When determining that data in all SLBAs of the storage unit 2C can be replaced by the (0-fill) data by the Security Erase Unit command, the control unit 200 firstly transmits the Security Erase Unit command to the storage unit 2C (step S525). This process creates the state in which the (0-fill) data is stored in the SLBA of the storage unit 2C.

Then, the control unit 200 transmits a read command including a read start SLBA and a read sector count to the storage units 2A, 2B, 2D, and 2E other than the storage unit 2C to read the data or parity in the first LBA region. The control unit 200 then calculates the data or parity in the first SLBA region in the storage unit 2C based upon the read data or parity (step S530).

Then, the control unit 200 determines whether the data calculated in step S530 is identical with the (0-fill) data or not. When the data calculated in step S530 is not identical with the (0-fill) data as a result of the determination, the control unit 200 transmits a write command for writing the data in the first SLBA region and the data calculated in step S530 to the storage unit 2C. As a result, the data or parity calculated in step S530 is actually written on the first SLBA region in the storage unit 2C.

On the other hand, when the data calculated in step S530 matches the (0-fill) data as a result of the determination in step S540, the control unit 200 executes no process. Since the process in step S525 is preliminarily performed, the (0-fill) data is already written on the first SLBA region.

Then, the control unit 200 confirms whether the restoration of all SLBAs in the storage unit 2C is completed or not (S580). When the restoration of all SLBAs is not completed, the control unit 200 selects the next SLBA region that is to be restored (step S590), and executes the processes similar to the processes described above to the next SLBA region as described above, thereby restoring data or parity in the next SLBA region in the storage unit 2C. This process is sequentially repeated to each SLBA region to restore all SLBAs in the storage unit 2C.

As described above, according to the third embodiment, the Security Erase Unit command is firstly transmitted to the newly loaded (replaced) storage unit, and then, only when the restored data based upon the data in the other storage units does not match the (0-fill) data, the restored data is written on the storage region having its logical address. Accordingly, the time for rebuilding the storage array is shortened, and deterioration in the performance and reliability of the storage unit is not encouraged, compared to the case where restored data is written on all storage regions.

In the description above, the function of performing the array rebuilding process is given to the control unit 200 in the storage array device 1003 connected to the network by using the deletion notification. However, the function of performing the array rebuilding process by using the deletion notification may be given to a driver of a personal computer serving as a server or a client, or a BIOS (basic input/output system).

Figure 13:
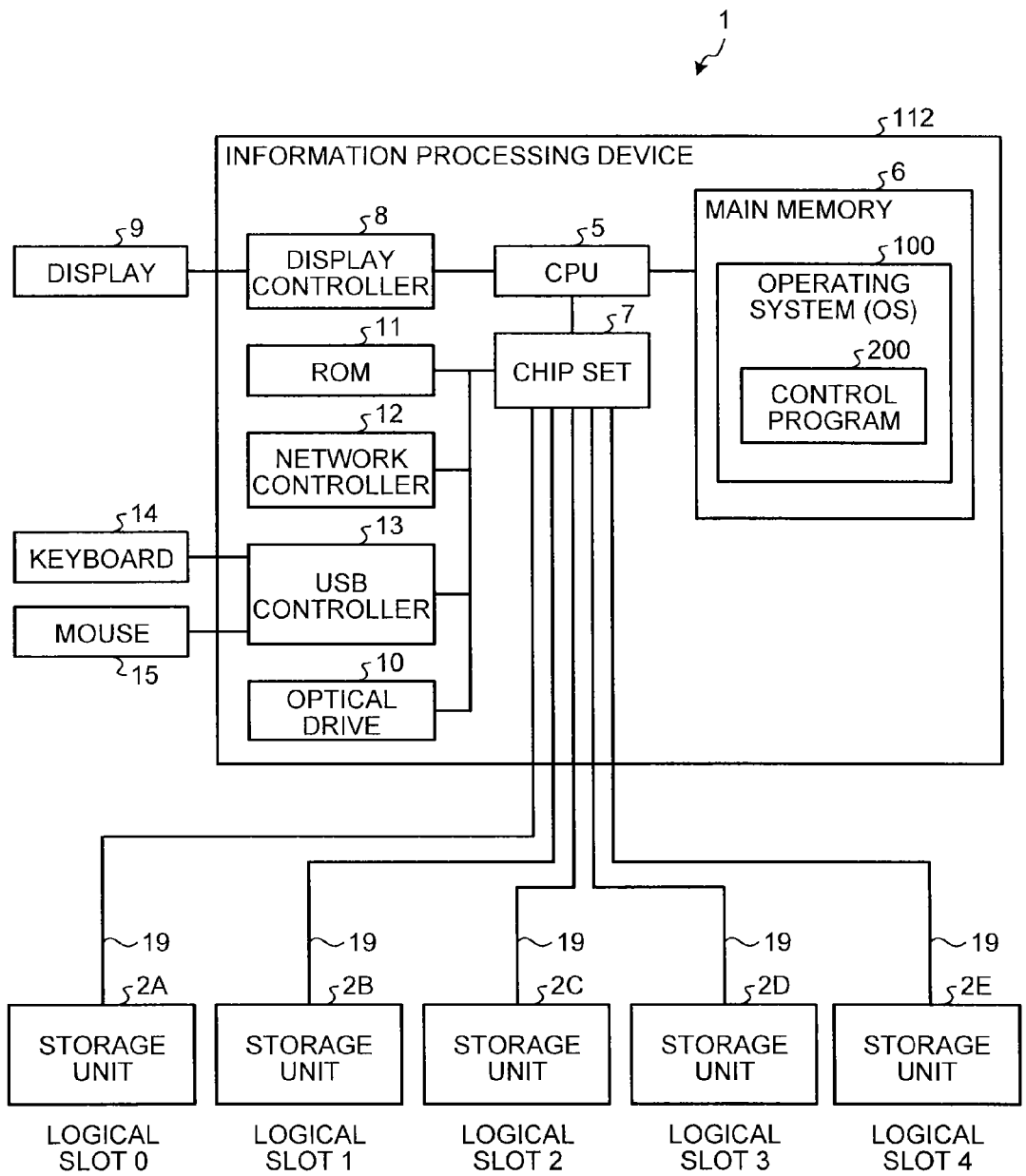
FIG. 13 is a functional block diagram illustrating an example of a configuration of another storage array system.

Alternatively, the storage array system 1 may be configured by a configuration illustrated in FIG. 13. The storage array system 1 includes an information processing device 111, a plurality of storage units 2A to 2E, and an interface 19 connecting the information processing device 111 and the storage units 2A to 2E. A CPU (control circuit) 5 is a central processing unit in the information processing device 111, and it performs various operations and control in the information processing device 111. The CPU 5 and a chipset 7 are connected by an interface such as a DMI (Direct Media Interface), and the CPU 5 controls the storage units 2A to 2E and an optical drive 10 such as a DVD drive via the chipset 7. The CPU 5 controls a main memory 6.

A user controls the information processing device 111 via an input device such as a keyboard 14 and a mouse 15. A signal from the keyboard 14 and the mouse 15 is processed in the CPU 5 via a USB (Universal Serial Bus) controller 13 and the chipset 7, for example. The CPU 5 transmits image data or text data to a display (display device) 9 via a display controller 8. The user can visually recognize the image data or the text data from the information processing device 111 on the display 9.

The CPU 5 is a processor provided to control the operation of the information processing device 111, and executes an operating system (OS) 100 loaded to the main memory 6. When the optical drive 10 allows the execution of at least one of a reading process and a writing process to the loaded optical disk, the CPU 5 executes these processes. The CPU 5 also executes UEFI (Unified Extensible Firmware Interface) firmware or system BIOS (Basic Input/Output system) stored in ROM 11. The CPU 5 also controls a network controller 12 via the chipset 7. Examples of the network controller 12 include LAN (Local Area Network) controller and a wireless LAN controller.

The main memory 6 functions as a work memory of the CPU 5 for temporarily storing a program or data. The main memory 6 includes a region storing the OS 100 and a control program 200.

The display controller 8 is a video reproduction controller controlling the display 9 of the information processing device 111. The chipset 7 is a bridge device connecting the CPU 5 and a local bus. The chipset 7 controls the storage units 2A to 2E forming the storage array via the interface 19. The storage units 2A to 2E may be connected to the CPU 5 via the chipset 7, or may directly be connected to the CPU 5.

In the storage array system 1 illustrated in FIG. 13, the control program 200 has the function of the control unit 200 in the RAID controller 1005 illustrated in FIG. 1.

In the embodiments described above, parity is used as an error correction code. However, any coding methods such as RS (Reed-Solomon) coding and BCH (Bose-Chaudhuri-Hocgenghem) coding may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage array system including:
   a plurality of storage units, at least one of the plurality of storage units having;
      a non-volatile memory,
      a mapping for associating a logical address with a physical address, and
      a first control unit configured to invalidate the mapping from the logical address designated by a received deletion notification, and when the mapping from the logical address designated by a received read command is invalid, configured to transmit data derived from the designated logical address by a first function, and
   a host device configured to control the plurality of storage units in a manner that the plurality of storage units configures a storage array, wherein
   the host device includes a second control unit configured to:
   read data from the storage units other than a replaced first storage unit among the plurality of storage units,
   calculate first data, using the read data, to be written in the first storage unit,
   determine whether the first data is identical with second data that is derived from a first logical address by the first function, the first logical address being mapped to a first physical address in the first storage unit in which the first data is to be written,
   transmit and write the first data to the first storage unit, when the first data is not identical with the second data, and
   transmit not the first data but the deletion notification to the first storage unit, when the first data is identical with the second data.

2. The storage array system according to claim 1, wherein the second control unit controls the plurality of storage units in a manner that the plurality of storage units configures a RAID.

3. The storage array system according to claim 2, wherein, the second control unit stores write data designated by a received write command and an error correction code for the write data in different storage units among the plurality of storage units.

4. The storage array system according to claim 1, wherein the second control unit reads data from the storage units other than the first storage unit, when detecting that the first storage unit is replaced.

5. The storage array system according to claim 1, wherein the second data is fixed data independent from logical addresses sent to the plurality of storage units.

6. The storage array system according to claim 1, wherein the first function indicates different data for at least two different logical addresses sent to the plurality of storage units.

7. The storage array system according to claim 1, wherein the second data is stored in a volatile memory or the non-volatile memory in the storage unit, the first control unit transmits the second data without calculating the second data by the first function, when the mapping from the logical address designated by the received read address is invalid.

8. A non-transitory recording medium that stores a control program loaded to a host device to which a plurality of storage units can be connected, at least one storage unit including non-volatile memory, a mapping for associating a logical address with a physical address, and a first control unit configured to invalidate the mapping from the logical address designated by a received deletion notification, and when the mapping from the logical address designated by a received read command is invalid, configured to transmit data derived from the designated logical address by a first function, the non-transitory recording medium storing a control program that causes the host device to:
   read data from storage units other than a replaced first storage unit among the plurality of storage units, calculate first data, using the read data, to be written in the first storage unit, determine whether the first data is identical with second data that is derived from a first logical address by the first function, the first logical address being mapped to a first physical address in the first storage unit in which the first data is to be written, transmit and write the first data to the first storage unit, when the first data is not identical with the second data, and transmit not the first data but the deletion notification to the first storage unit, when the first data is identical with the second data.

9. The non-transitory recording medium according to claim 8, wherein the control program controls the plurality of storage units in a manner that the plurality of storage units configures a RAID.

10. The non-transitory recording medium according to claim 9, wherein, the control program stores write data designated by a received write command and an error correction code for the write data in different storage units among the plurality of storage units.

11. The non-transitory recording medium according to claim 8, wherein the control program reads data from the storage units other than the first storage unit, when detecting that the first storage unit is replaced.

12. The non-transitory recording medium according to claim 8, wherein the second data is fixed data independent from logical addresses sent to the plurality of storage units.

13. The non-transitory recording medium according to claim 8, wherein the first function indicates different data for at least two different logical addresses sent to the plurality of storage units.

14. The non-transitory recording medium according to claim 8, wherein the second data is stored in a volatile memory or the non-volatile memory in the storage unit, the first control unit transmits the second data without calculating the second data by the first function, when the mapping from the logical address designated by the received read address is invalid.

15. A storage array system including:
   a plurality of storage units, at least one of the plurality of storage units having;
      a non-volatile memory,
      a mapping for associating a logical address with a physical address, and
      a first control unit configured to invalidate the mapping from the logical address designated by a received deletion notification, and when the mapping from the logical address designated by a received read command is invalid, configured to transmit second data to a host device, and
   the host device configured to control the plurality of storage units in a manner that the plurality of storage units configures a storage array, wherein
   the host device includes a second control unit configured to:
   transmit the deletion notification to a first storage unit, which is replaced, among the plurality of storage units in a manner that all mappings from all storage regions in the first storage unit are invalidated,
   read data from storage units other than the replaced first storage unit among the plurality of storage units,
   calculate first data, using the read data, to be written in the first storage unit,
   determine whether the first data is identical with the second data, and
   transmit and write the first data to the first storage unit, when the first data is not identical with the second data.

16. The storage array system according to claim 15, wherein the second control unit controls the plurality of storage units in a manner that the plurality of storage units configures a RAID.

17. The storage array system according to claim 16, wherein, the second control unit stores write data designated by a received write command and an error correction code for the write data in different storage units among the plurality of storage units.

18. The storage array system according to claim 15, wherein the second control unit reads data from the storage units other than the first storage unit, when detecting that the first storage unit is replaced.

19. The storage array system according to claim 15, wherein the second data is fixed data independent from logical addresses sent to the plurality of storage units.

20. The storage array system according to claim 15, wherein the first function indicates different data for at least two different logical addresses sent to the plurality of storage units.

* * * * *